(12) United States Patent
Lin

(10) Patent No.: US 10,963,632 B2
(45) Date of Patent: Mar. 30, 2021

(54) METHOD, APPARATUS, DEVICE FOR TABLE EXTRACTION BASED ON A RICHLY FORMATTED DOCUMENT AND MEDIUM

(71) Applicant: PAI TECH Company Limited, Beijing (CN)

(72) Inventor: Demiao Lin, Beijing (CN)

(73) Assignee: PAI TECH Company Limited, Beijing (CN)

( * ) Notice: Subject to any disclaimer, the term of this patent is extended or adjusted under 35 U.S.C. 154(b) by 42 days.

(21) Appl. No.: 16/421,424

(22) Filed: May 23, 2019

(65) Prior Publication Data

US 2019/0361972 A1 Nov. 28, 2019

(30) Foreign Application Priority Data

May 24, 2018 (CN) .......................... 201810507514.4

(51) Int. Cl.
*G06F 40/177* (2020.01)
*G06F 40/106* (2020.01)
*G06F 40/117* (2020.01)
*G06N 3/04* (2006.01)

(52) U.S. Cl.
CPC .......... *G06F 40/177* (2020.01); *G06F 40/106* (2020.01); *G06F 40/117* (2020.01); *G06N 3/0418* (2013.01)

(58) Field of Classification Search
CPC ...... G06F 40/177; G06F 40/18; G06F 40/117; G06F 40/106; G06N 3/0418
USPC ................................ 715/227, 212, 234, 273
See application file for complete search history.

(56) References Cited

U.S. PATENT DOCUMENTS

| | | | |
|---|---|---|---|
| 2004/0030687 A1* | 2/2004 | Hidaka | G06F 40/131 |
| 2019/0266394 A1* | 8/2019 | Yu | G06K 9/00456 |
| 2019/0303663 A1* | 10/2019 | Krishnapura Subbaraya | G06K 9/00449 |

* cited by examiner

*Primary Examiner* — Thu V Huynh
(74) *Attorney, Agent, or Firm* — Law Offices of Liaoteng Wang

(57) ABSTRACT

The disclosure discloses a method, apparatus, device for table extraction based on a richly formatted document and medium. The method comprises: acquiring page content; performing a table detection process on the page content by use of a preset table detection model to obtain a list of table tags, and to obtain a first table content; performing, by use of a preset through-line drawing model, a through-line drawing process on the first table content to obtain a list of through-line tags, and to obtain a second table content; and performing, by use of a preset table-cell merging model, a table-cell merging process on the second table content to obtain a list of short-line tags, and to obtain an explicit table content.

15 Claims, 10 Drawing Sheets textbox

Notes to financial Statements 2015 (Unless otherwise stated, the unit of the amount is RMB)

Tax

The main taxes applicable to the Group and their tax rates are listed below:

| tax category | tax rate | tax base |
|---|---|---|
| corporate income tax | 25% | texable income |
| business tax | 3%and5% | taxable turnover |
| added-value tax | 3%、6%and17% | taxable sales |
| urban maintenance and construction tax | 7% | business tax/added-value tax paid |
| extra charges of education funds | 3% | business tax/added-value tax paid |
| extra charges of local education funds | 2% | business tax/added-value tax paid |
| property tax | 1.2% | 70% of the original value of the taxable property |
| land use tax | 30 yuan/square meter/year | actual occupied land area |

24page

Fig. 3

Notes to financial Statements
2017
(Unless otherwise stated, unit of amount is RMB)

4. Notes to consolidated financial statements (continued)
(6) Accounts receivable (continued)

(b) Accounts receivable are analyzed by category as follows:

| | December 31, 2017 | | | | December 31, 2016 | | | |
|---|---|---|---|---|---|---|---|---|
| | Book balance | | Provision for bad debt | | Book balance | | Provision for bad debt | |
| | amount | proportion of total | amount | proportion of provision | amount | proportion of total | amount | proportion of provision |
| Receivables with significant single amount and single provision for bad debts | 1,316,117,426.42 | 4.04% | (218,974,229.29) | 16.64% | 779,392,810.57 | 2.74% | (377,046,802.55) | 48.38% |
| Aging analysis combination | 29,647,288,387.01 | 91.08% | (341,659,914.93) | 1.15% | 26,727,319,030.73 | 93.88% | (262,848,574.45) | 0.98% |
| Receivables with a non-significant single amount and separate provision for bad debts | 1,588,822,250.22 | 4.88% | (614,033,392.79) | 38.65% | 964,358,292.39 | 3.35% | (538,412,901.13) | 55.83% |
| | 32,552,228,063.65 | 100.00% | (1,174,667,536.92) | | 28,471,070,133.79 | 100.00% | (1,178,315,378.43) | |

→ A first implicit table area (c) On December 31, 2017, the accounts receivable with significant single amount and separate provision for bad debts are analyzed as follows

| | Book balance | Provision for bad debt | Proportion of provision | Reason |
|---|---|---|---|---|
| Accounts receivable1 | 225,480,369.47 | (1,245,111.90) | 0.55% | After assessment, individual identification |
| Accounts receivable2 | 143,299,071.98 | (923,446.80) | 0.64% | After assessment, individual identification |
| Accounts receivable3 | 138,402,268.93 | (138,402,368.93) | 100.00% | After assessment, individual identification |
| Accounts receivable4 | 118,170,182.48 | (687,712.50) | 0.58% | After assessment, individual identification |
| others | 690,765,434.46 | (77,715,589.46) | 11.25% | After assessment, individual identification |
| | 1,316,117,426.42 | (218,974,229.29) | | |

→ A second implicit table area (d) In the accounts receivable with provision for bad debts by combination, the combination analysis using the ageing analysis method is as follows

| | December 31, 2017 | | | December 31, 2016 | | |
|---|---|---|---|---|---|---|
| | Book balance | Provision for bad debt | | Book balance | Provision for bad debt | |
| | amount | amount | proportion of provision | amount | amount | proportion of provision |
| Within one year | 29,351,483,708.80 | (146,689,793.02) | 0.50% | 26,532,739,407.22 | (132,700,023.36) | 0.50% |
| One to two years | 201,269,112.60 | (100,634,556.30) | 50.00% | 128,862,144.83 | (64,431,972.42) | 50.00% |
| Two to three years | 94,535,565.61 | (94,535,565.61) | 100.00% | 65,717,478.68 | (65,717,478.68) | 100.00% |
| | 29,647,288,387.01 | (341,659,914.93) | | 26,727,319,030.73 | (262,848,574.46) | |

Fig. 4

| Registration | Registered capital | Business nature and business scope | Proportion of equity held by the company | | Proportion of voting rights of the company | |
|---|---|---|---|---|---|---|
| | | | Direct | Indirect | Direct | Indirect |
| BEIJING | RMB 1,007,282,534yuan | Property leasing | 80.65% | - | 80.65% | - |
| BEIJING | RMB 10,000,000yuan | Property management and catering services | 5% | 76.36% | 5% | 95% |
| BEIJING | RMB 10,000,000yuan | Conference, exhibition services and economic and trade consultation | - | 80.65% | - | 100% |

⇩ Through-line drawing

| Registration | Registered capital | Business nature and business scope | Proportion of equity held by the company | | Proportion of voting rights of the company | |
|---|---|---|---|---|---|---|
| | | | Direct | Indirect | Direct | Indirect |
| BEIJING | RMB 1,007,282,534yuan | Property leasing | 80.65% | - | 80.65% | - |
| BEIJING | RMB 10,000,000yuan | Property management and catering services | 5% | 76.36% | 5% | 95% |
| BEIJING | RMB 10,000,000yuan | Conference, exhibition services and economic and trade consultation | - | 80.65% | - | 100% |

Fig. 5

|  |  | Business nature and business scope | Proportion of equity held by the company | | Proportion of voting rights of the company | |
|---|---|---|---|---|---|---|
| Registration | Registered capital | | Direct | Indirect | Direct | Indirect |
| BEIJING | RMB 1,007,282,534yuan | Property leasing | 80.65% | - | 80.65% | - |
| BEIJING | RMB 10,000,000yuan | Property management and catering services | 5% | 76.36% | 5% | 95% |
| BEIJING | RMB 10,000,000yuan | Conference, exhibition services and economic and trade consultation | - | 80.65% | - | 100% |

Table-cell merging process

|  |  | Business nature and business scope | Proportion of equity held by the company | | Proportion of voting rights of the company | |
|---|---|---|---|---|---|---|
| Registration | Registered capital | | Direct | Indirect | Direct | Indirect |
| BEIJING | RMB 1,007,282,534yuan | Property leasing | 80.65% | - | 80.65% | - |
| BEIJING | RMB 10,000,000yuan | Property management and catering services | 5% | 76.36% | 5% | 95% |
| BEIJING | RMB 10,000,000yuan | Conference, exhibition services and economic and trade consultation | - | 80.65% | - | 100% |

Fig. 6

METHOD, APPARATUS, DEVICE FOR TABLE EXTRACTION BASED ON A RICHLY FORMATTED DOCUMENT AND MEDIUM

CROSS-REFERENCE TO RELATED APPLICATION

This application is based upon and claims priority to Chinese Patent Application No. 201810507514.4, filed on May 24, 2018, the content of which is incorporated herein by reference in its entirety.

TECHNICAL FIELD

The present disclosure relates to the field of computer technologies, and particularly to a method, apparatus, device for table extraction based on a richly formatted document and medium.

BACKGROUND

The richly formatted document in the prior art include but are not limited to scanned file, cross-platform file format, web page and the like. The cross-platform file format include PDF document, Word document, etc., which is composite organic typesetting of components such as titles, text chapters and paragraphs, tables, images and so on.

A table is a data structure that contains abundant information for humans and has a highly structured form for machines. Therefore, it is of great research value and application value to extract table data in the richly formatted document.

However, at present, there is no good extraction method for implicit tables in the rich text document, and it is not possible to accurately extract implicit tables in the rich text document.

SUMMARY

The embodiments of the present disclosure provide a method, apparatus, device for table extraction based on richly formatted document and medium, which can accurately extract implicit tables in the rich text document.

According to an aspect of the embodiments of the present disclosure, a method for table extraction based on the richly formatted document is provided, the method comprising:

acquiring the richly formatted document which includes at least one page content;

performing, by use of a preset table detection model, a table detection process on the page content in the richly formatted document to obtain a list of table tags, and to obtain a first table content according to the page content and the list of table tags;

performing, by use of a preset through-line drawing model, a through-line process on the first table content to obtain a list of through-line tags, and to obtain a second table content according to the first table content and the list of through-line tags; and performing, by use of a preset table-cell merging model, a table-cell merging process on the second table content to obtain a list of short-line tags, and to obtain an explicit table content according to the list of short-line tags and the second table content.

According to another aspect of the embodiments of the present disclosure, an apparatus for table extraction based on the richly formatted document is provided, the apparatus comprising an acquiring unit, a preset table detection unit, a preset through-line drawing unit and a preset table-cell merging unit, wherein;

the acquiring unit is configured to acquire the richly formatted document which includes at least one page content;

the preset table detection unit is configured to perform a table detection process on each page content in the richly formatted document to obtain a list of table tags, and obtain a first table content according to the page content and the list of table tags;

the preset through-line drawing unit is configured to perform a through-line drawing process on the first table content to obtain a list of through-line tags, and obtain a second table content according to the first table content and the list of through-line tags; and the preset table-cell merging unit is configured to perform a table-cell merging process on the second table content to obtain a list of short-line tags, and obtaining an explicit table content according to the list of short-line tags and the second table content.

According to a further aspect of the embodiments of the present disclosure, a device is provided, the device comprising a processor and a memory storing computer program instructions which, when executed by the processor, cause the processor to perform the method for table extraction according to the first aspect.

According to a yet aspect of the embodiments of the present disclosure, a computer readable storage medium is provided. The computer readable storage medium stores computer program instructions which, when executed by a processor, cause the processor to perform the method for table extraction according to the first aspect.

With the method, apparatus, device for table extraction based on richly formatted document and medium according to the embodiments of the present disclosure, the implicit table content in the richly formatted document may be extracted to obtain explicit table content by use of the preset table detection model, the preset through-line drawing model and the preset table-cell merging model. It not only improves the efficiency of extraction, but also improves the accuracy of extraction, thereby accurately extracting the implicit table content in the rich text document.

BRIEF DESCRIPTION OF THE DRAWINGS

To more clearly illustrate technical solutions of embodiments of the present disclosure, the accompanying drawings, which are to be used in the embodiments of the present disclosure, will be briefly described below. Those skilled in the art will be able to obtain additional drawings in accordance with these drawings without any creative work.

FIG. 3 is a schematic diagram showing page content according to an embodiment of the present disclosure;

FIG. 4 is a schematic diagram showing an detected implicit table according to an embodiment of the present disclosure;

FIG. 5 is a schematic diagram showing a through-line drawing process according to an embodiment of the present disclosure;

FIG. 6 is a schematic diagram showing a table-cell merging process according to an embodiment of the present disclosure;

DETAILED DESCRIPTION

Various aspects of features and exemplary embodiments of the present disclosure will be described in detail below. The present disclosure will be provided in further detail below in conjunction with accompanying drawings and embodiments in order to make objects, technical solutions and advantages of the present disclosure to be more clearly understood. It is to be appreciated that the specific embodiments described herein are to be construed to illustrate the present disclosure but not to limit the present disclosure. It will be apparent to those skilled in the art that the present disclosure may be practiced without some of these specific details. The following description of the embodiments is merely to provide a better understanding of the present disclosure by illustrating examples thereof.

It is to be noted that relational terms such as first, second and the like are used herein only to distinguish an entity or operation from another entity or operation without requiring or implying that there is any such actual relationship or order between these entities or operations. Moreover, the term "comprise", "include" or any other variant thereof is intended to encompass a non-exclusive inclusion, such that a process, method, article or device that includes a series of elements includes not only these elements but also other elements that are not explicitly listed or those elements that are inherent to such a process, method, article or device. In the absence of more restrictions, elements defined by the statement "includes . . . " do not preclude the presence of additional identical elements in the process, method, article or device that includes the elements.

In the embodiments of the present disclosure, the following three models are mainly used, namely a preset table detection model, a preset through-line drawing model, and a preset table-cell merging model. All the three models may be trained by a training method of deep convolutional neural network. Of course, in this application, the training method of deep convolutional neural network is not limited, and other training methods may also be used.

Figure 1:
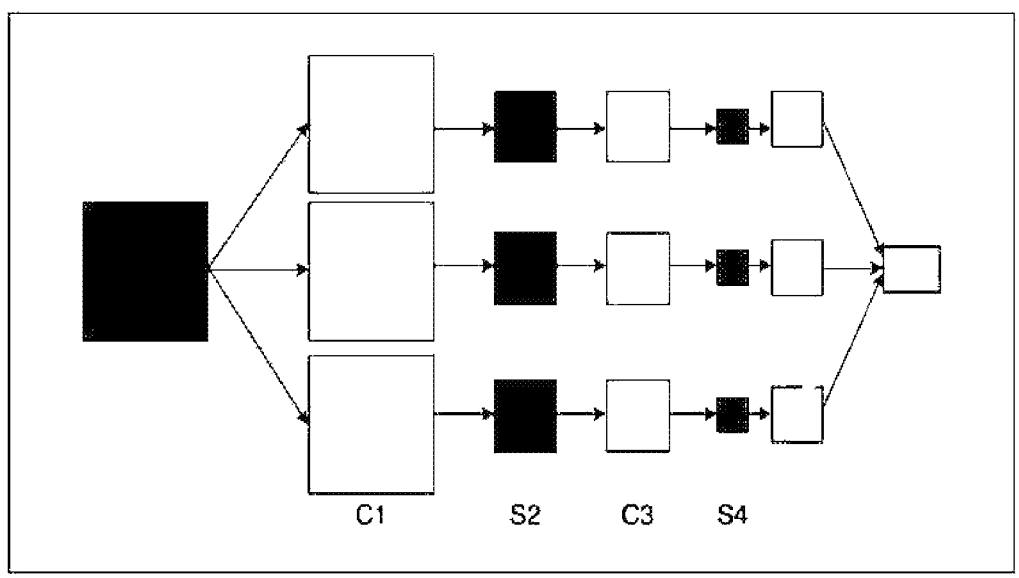
FIG. 1 is a schematic structural diagram of a network structure of a deep convolutional neural network in the prior art.

FIG. 1 is a schematic structural diagram of a network structure of the deep convolutional neural network in the prior art.

The deep convolutional neural network is a multi-layer neural network, each layer consists of a plurality of two-dimensional planes, and each plane consists of a plurality of independent neurons.

It will be appreciated that, as shown in FIG. 1, the input image is convolved by three trainable filters and an addable bias, for example. After the convolution, three feature maps are generated in a C1 layer, and then four pixels of each group in the feature map are summed, weighted, and biased. Three feature maps of S2 layer are obtained by a Sigmoid function. These maps are then filtered to obtain a C3 layer. Like S2, this hierarchy then generates S4. Finally, these pixel values are rasterized and connected into a vector which is input to a traditional neural network, so as to obtain an output.

In general, C layers are feature extraction layers, and the C layers may include a C1 layer and a C3 layer. An input of each neuron is associated with local features of a previous layer, and the local features are extracted. Once the local features are extracted, the position relationship between them and other features is determined accordingly.

S layers are feature mapping layers, and the S layers include an S2 layer and an S4 layer. Each feature mapping layer of network consists of a plurality of feature mappings, each of which is a plane, and all neurons on the plane have equal weights. The feature mapping structure uses the sigmoid function with a small influence as an activation function of the convolutional network, so that the feature mapping has displacement invariance.

In addition, since the neurons on one mapping plane share weights, a number of free parameters of network is reduced, and complexity of network parameter selection is reduced. Each feature extraction layer in the convolutional neural network is followed by a feature mapping layer for local averaging and secondary extraction. This unique two-time feature extraction structure enables the network to have a high distortion tolerance for input samples in recognition.

In the embodiment of the present disclosure, three models are trained by the deep convolutional neural network. The implicit table content in the richly formatted document may be extracted to obtain the explicit table content by use of these three models.

For a better understanding of the present disclosure, the method, apparatus, device for table extraction and medium according to the embodiment of the present disclosure will be described in detail below with reference to the accompanying drawings. It should be noted that these embodiments are not intended to limit the scope of the present disclosure.

Figure 2:
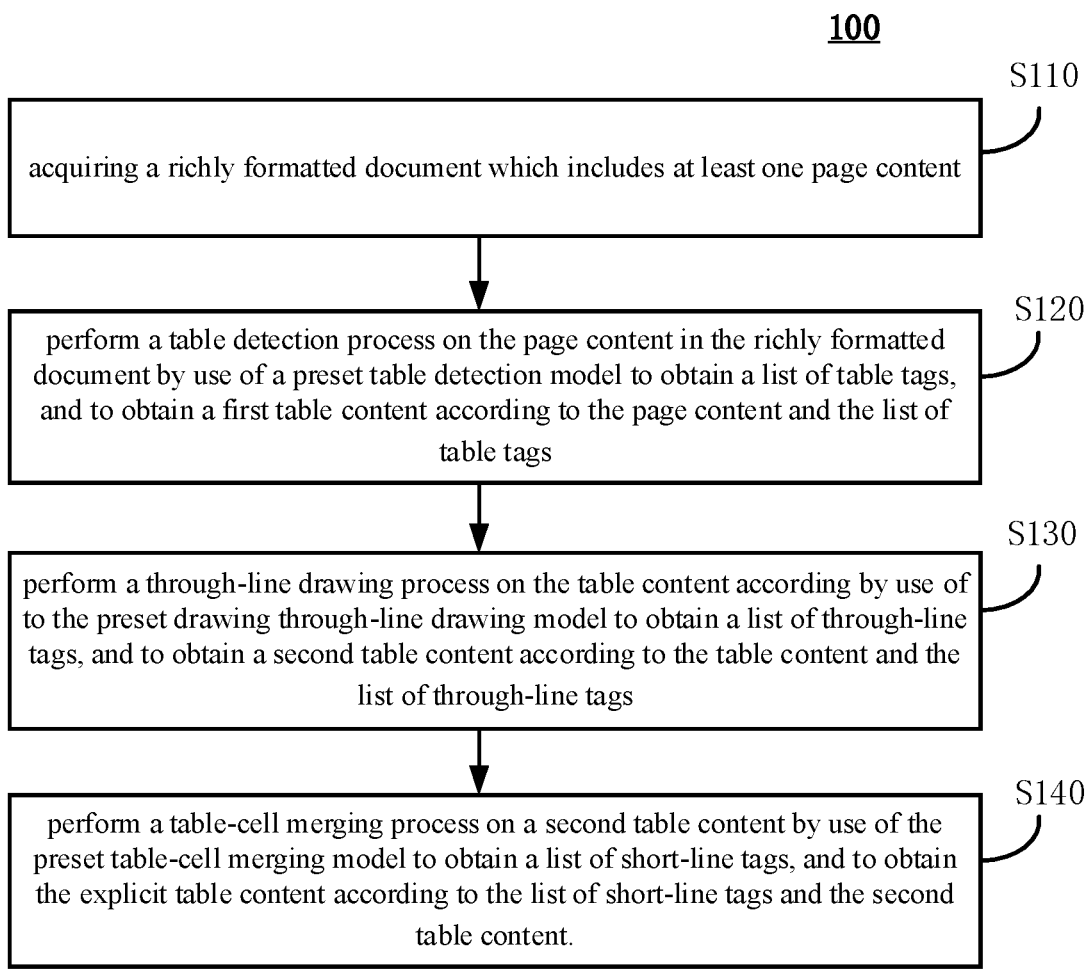
FIG. 2 is a flowchart showing a method for table extraction based on the richly formatted document according to an embodiment of the present disclosure.

FIG. 2 is a flowchart showing a method for table extraction based on a richly formatted document according to an embodiment of the present disclosure. FIG. 3 is a schematic diagram showing page content according to an embodiment of the present disclosure. FIG. 4 is a schematic diagram showing a detected implicit table according to an embodiment of the present disclosure. FIG. 5 is a schematic diagram showing a through-line drawing process according to an embodiment of the present disclosure. FIG. 6 is a schematic diagram showing a table-cell merging process according to an embodiment of the present disclosure.

As shown in FIG. 2, in the embodiment, a method 100 for table extraction based on the richly formatted document includes the following steps.

Step S110: acquiring a richly formatted document which includes at least one page content.

In this step, the richly formatted document includes but is not limited to scanned file, cross-platform file format, web page and so on. The cross-platform file format includes PDF document, Word document, etc., which is composite organic typesetting of components such as titles, text chapters and paragraphs, tables, and images.

In the embodiment of the present disclosure, each page content in the richly formatted document is acquired in the form of image. As shown in FIG. 3, each page content includes all lines, color blocks such as red and black blocks, text box positions such as a first table on page 24, text box content and some other visual information in the page.

Step S120: performing a table detection process on the page content in the richly formatted document by use of a preset table detection model to obtain a list of table tags, and to obtain a first table content according to the page content and the list of table tags.

In the step, the preset table detection model first detects whether there is an implicit table in the page content in the richly formatted document. If there is an implicit table, position information of the implicit table needs to be extracted to form a list of table tags.

In one example, the list of table tags includes an abscissa of an upper left corner of the implicit table, an ordinate of an upper left corner of the implicit table, a width of the implicit table, and a height of the implicit table.

As shown in FIG. 4, detection of the implicit table area is predicted by use of the preset table detection model.

Detecting a first implicit table area and a second implicit table area is to detect an abscissa and an ordinate of an upper left corner, a width and a height of the first implicit table area and made them into table tags of the first implicit table. An abscissa and an ordinate of an upper left corner, a width and a height of the second implicit table area are detected and made into table tags of the second implicit table. The table tags of the first implicit table and the table tags of the second implicit table are then combined into a list of table tags.

Step S130: performing a through-line drawing process on the table content by use of the preset through-line drawing model to obtain a list of through-line tags, and to obtain a second table content according to the table content and the list of through-line tags.

In the step, as shown in FIG. 5, the through-line are mainly drawn for the implicit table detected in step S120, and the through-line includes a transverse through-line and a longitudinal through-line. After the through-line are drawn, the coordinates of each through-line and each longitudinal through-line are recorded to form a list of through-line tags.

Step S140: performing a table-cell merging process on a second table content by use of the preset table-cell merging model to obtain a list of short-line tags, and to obtain the explicit table content according to the list of short-line tags and the second table content.

In this step, as shown in FIG. 6, the table-cell merging process is performed on the second table content in step S130. That is, the through-line is first divided into short-lines to obtain a list of short-line tags, and merged short-lines are determined by the list of short-line tags to obtain the explicit table, and the implicit table content are filled into the explicit table to obtain the explicit table content.

According to the method of the embodiment of the present disclosure, the implicit table content in the richly formatted document may be extracted by use of the preset table detection model, the preset through-line drawing model, and the preset table-cell merging model to obtain the explicit table content. It not only improves the efficiency of extraction, but also improves the accuracy of extraction, thereby accurately extracting the implicit table content.

A training process for the preset table detection model, the preset through-line drawing model, and the preset table-cell merging model will be described below by way of embodiments.

In an embodiment, step 120 includes:

Step 121: performing a rendering process on the page content to obtain a page content tensor of the page content.

In the step, text information and visual information are extracted from the page content, the text information is made into a text information tensor, and the visual information is made into a visual information tensor. The visual information is for example color block information, line information and so on, and is information that may be perceived by human vision for typesetting or distinguishing. The text information tensor and the visual information tensor are combined to form a final page content tensor.

Step 122: obtaining a list of table tags according to a first preset training parameter and the page content tensor.

In the step, the table tag tensor can be output by inputting the page content tensor into the preset table detection model, and the list of table tags is correspondingly obtained by the output table tag tensor.

It should be noted that a first dimension of the table tag tensor represents the number of rows m, a second dimension of the table tag tensor represents the number of columns n, and a third dimension of the table tag tensor represents five dimensions, components of the five dimensions respectively indicating whether there is a table, an abscissa of table center point, an ordinate of the table center point, a height of the table, and a width of the table, m and n being integers greater than 0. For example, the first component may be marked as 0 or 1, the first component marked as 0 indicates there is a table, the first component marked as 0 indicates there is not a table, and the components of the remaining four dimensions are all marked as 0.

Figure 7:
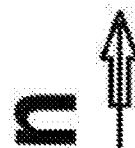
FIG. 7 is a schematic diagram showing page content division according to an embodiment of the present disclosure.

FIG. 7 is a schematic diagram showing page content division according to an embodiment of the present disclosure.

In an example, each page content is divided into m×n areas to determine a table tag tensor for each area containing a table, and m and n determine that each area contains only one table and each table belongs to only one area.

As shown in FIG. 7, there are four tables in one page content, each area contains only one table and each table belongs to only one area, so it may only be divided into at least 2×2 areas.

Therefore, the list of table tags consists of an abscissa and an ordinate of an upper left corner, a width, and a height of each of the four areas.

In an embodiment, Step 122 can be illustrated by the following steps.

Step 1221: calculating a page content tensor according to the first preset training parameter to determine a feature tensor of the page content.

In the step, an input page content tensor is calculated by use of a pre-trained first preset training parameter. The first preset training parameter may be a parameter trained by use of the deep convolutional neural network.

The first preset training parameter is obtained by training the page content tensor as an input to the deep convolutional neural network and the table tag tensor as an output of the deep convolutional neural network in advance.

In the deep convolutional neural network training, the input page content tensor is extracted according to the first preset training parameter to obtain a feature tensor of the page content.

Further, in one example, the first preset training parameter is a parameter determined when the first objective function is constructed by the feature tensor of the page content and the preset table tag tensor.

It should be understood that, in the embodiment of the present disclosure, the first objective function may be a square error $J(\theta)$ loss function, that is, a least squares loss function calculated by the feature tensor of the page content and the table tag tensor. The likelihood estimation of data may be maximized by minimizing the loss function $J(\theta)$.

The following formula (1) is the loss function $J(\theta)$.

$$J(\theta) = \frac{1}{2n}\sum_{i=1}^{n} avg\left((y^i - h_\theta(x^i))^2\right) \quad (1)$$

$x^i$ represents the i-th page content tensor, $h_\theta(x^i)$ represents the feature tensor of the page content obtained by training the i-th page content tensor by use of the deep convolutional neural network, $\theta$ is a parameter of the neural network, $y^i$ represents a table tag tensor, n represents a total number of page content tensors, and avg is a mean value of all elements in the i-th page content tensor.

The parameter updating of the deep convolutional neural network is performer by using a batch gradient descent method to obtain a first preset training parameter. The updating process of the parameter is as follows:

In a first step, the derivative is to be derived, that is, the derivative of the first objective function with respect to each parameter in the neural network is obtained. For example, a partial derivative of $J(\theta)$ with respect to $\theta$ is obtained according to formula (2) to obtain gradient corresponding to each $\theta$.

$$\frac{\partial J(\theta)}{\partial \theta_i} = -\frac{1}{n}\sum_{i=1}^{n}(y^i - h_\theta(x^i))x^i \quad (2)$$

In a second step, since it is necessary to minimize the loss function $J(\theta)$, each parameter $\theta$ is updated according to formula (3), which is negative direction of the gradient of each parameter $\theta_i$ thereby determining the first preset training parameter.

$$\theta_i' = \theta_i - \eta \times \frac{\partial J(\theta)}{\partial \theta_i} \quad (3)$$

where $\eta$ is a super-parameter learning rate, $\theta_i$ is a parameter of the i-th neural network, and $$\frac{\partial J(\theta)}{\partial \theta_i}$$

represents a derivative of the loss function $J(\theta)$ with respect to the parameter of the i-th neural network, $\theta'_i$ represents a parameter of the updated i-th neural network.

Of course, the parameter updating of the deep convolutional neural network may also be performed by using the stochastic gradient descent method, for which the embodiment of the present disclosure does not perform detailed process analysis.

Step 1222: traversing table information of each area in the feature tensor to determine a prediction value.

If the prediction value is greater than the preset reliability threshold, it is judged that an area contains a table, or if the prediction value is less than the preset reliability threshold, it is judged that an area does not contain a table. In the step, the prediction vector is determined by traversing table information of each area in the feature tensor, and a dimension of the prediction vector is five dimensions. If a prediction value of a first dimension of the prediction vector is greater than the preset reliability threshold which may be 0.5, then the preset table detection model considers that the area contains a table, and a center point abscissa, a center point ordinate, a width and a height of the table are the 2nd to 5th dimension of the prediction vector. If the prediction value of the first dimension is less than the preset reliability threshold, the preset table detection model considers that the area does not contain a table.

Step 1223, determining a table tag for each area containing a table to obtain a list of table tags.

In the step, a table tag for an area containing a table may be obtained by determining a table tag tensor for each area containing a table, and a list of table tags may be obtained by table tags for all areas containing a table.

In an embodiment, a dimension of the feature tensor of the page content is the same as that of the preset table tag tensor. For example, if the dimension of the preset table tag tensor is K dimensions, the dimension of the feature tensor of the page content is also K dimensions.

In an embodiment, step 130 may be implemented by the following steps.

Step 131: perform a rendering process on the first table content to obtain a second table content tensor.

In the step, the rendering process is the same as the rendering process in step 121, except that the rendering process is performed on the table content in the step, and the rendering process is performed on the page content in step 121.

Step 132: obtaining a list of through-line tags according to a second table content tensor and a second preset training parameter.

In the embodiment of the present disclosure, a second preset training parameter is obtained by training the second table content tensor as an input of the deep convolutional neural network and the through-line tag tensor as an output of the deep convolutional neural network. A list of through-line tags may be predicted by the second preset training parameter and the second table content tensor.

In an embodiment, the second preset training parameter is a parameter determined by a feature tensor of the second table content and a preset through-line tag tensor. The feature tensor of the second table content is a parameter obtained by performing feature extraction on the first table content. The preset through-line tag tensor consists of a plurality of through-line vectors, each of which refers to a centerline vector of each area.

It should be understood that since upward or downward shift of one transverse through-line has no effect on table division, that is, an arbitrary through-line may be selected in an ordinate area. Therefore, in order to simplify the learning and training difficulty of the preset through-line drawing model, each through-line vector is a centerline of each area. The ordinate of each area may be represented by a two-dimensional vector. For example, if the ordinate vector of the area is (0, 1), it means that one transverse through-line is drawn in the ordinate area, and if the ordinate vector of the area is (1, 0), it means that one transverse through-line is not drawn in the ordinate area. The tensor corresponding to the coordinates of the transverse through-line is the transverse through-line tag tensor. Similarly, the tensor corresponding to the coordinates of the transverse through-line is a longitudinal through-line tag tensor.

In the embodiment, the feature tensor of the second table contents is obtained by performing feature extraction by use of the deep convolutional neural network layer by layer.

In an example, the second preset training parameter is a parameter determined when the second objective function is constructed by the feature tensor of the second table content and the preset through-line tag tensor. The second objective function may be designed as a negative log likelihood function, for example the negative log-likelihood function $J(\theta)$ as shown in formula (4).

$$J(\theta) = -\frac{1}{n}\sum_{i=1}^{n} avg(y^i * \log(\text{softmax}(h_\theta(x^i)))) \quad (4)$$

If $h_\theta(x^i)$ is expressed with z, then softmax $(h_\theta(x^i))$ is given by formula (5) as follows:

$$\text{softmax}(z) = \frac{1}{\sum_{j=1}^{k} e^{z_j}} \begin{bmatrix} e^{z_1} \\ e^{z_2} \\ \cdots \\ e^{z_k} \end{bmatrix} \quad (5)$$

where $x^i$ represents a tensor of the i-th second table content, $h_\theta(x^i)$ represents a feature tensor of the second table content obtained by training i-th second table content tensor by use of the deep neural network, where $\theta$ is a parameter of the deep neural network, $y^i$ represents a table tag tensor of the i-th second table content tensor, n represents a total number of the second table content tensors, and avg is a mean value of all elements of the second table content tensor.

The softmax function refers to operating on each feature tensor of the second table content, $z_j$ is a j-th dimension of the feature tensor of the second table content, and k is a dimension number of the feature tensor of the second table content. In the embodiment of the present disclosure, k=2, $h_\theta(x^i)$ may be regarded as the feature tensor of the second table content whose number is equal to that of transverse through-lines or the feature tensor of the second table content whose number is equal to that of the longitudinal through-lines.

The second preset training parameter is determined by minimizing the transverse through-line objective function and the longitudinal through-line objective function, and maximizing the likelihood estimation of data. It should be understood that, like the preset table detection model described above, the parameter updating of the deep convolutional neural network are performed by using the parameter gradient descent method. Therefore, the parameter updating of the deep convolutional neural network using the batch gradient descent method is not described again.

The table content tensor is input to the preset through-line drawing model. The predicted list of through-line tags is output according to the parameter updated by use of the preset through-line drawing model. The list of through-line tags includes a list of transverse through-line tags and a list of longitudinal through-line tags. The list of transverse through-line tags records whether there is a transverse through-line on each ordinate of the table, and the list of longitudinal through-line tag records whether there is a longitudinal through-line on each abscissa of the table.

In an embodiment, a dimension of the feature tensor of the table content is the same as that of the preset through-line tag tensor.

In an embodiment, step 140 can be implemented by the following steps.

Step 141: performing a rendering process on the second table content to obtain a third table content tensor.

In the step, rendering processing is performed on the second table content obtained in step S130, and the rendering processing here is mainly performed on the table content with through-line.

Step 142: performing a feature process on the third table content tensor to obtain a table feature map.

In the step, feature extraction is performed on the third table content tensor by use of the deep convolutional neural network layer by layer to obtain a table feature map. In the step, the feature extraction process which is performed on the third table content tensor by use of the deep convolutional neural network layer by layer is the same as that in the above steps. And will not be described here.

Step 143, obtaining a list of short-line tags according to the table feature map and the third preset training parameter.

In an embodiment, the third preset training parameter is a parameter determined by a short-line feature tensor and a preset short-line tag tensor. The short-line feature tensor is a parameter obtained by splicing feature vectors of each cell. The feature vectors of each cell are parameters obtained by performing feature extraction on each cell. The cell is obtained by dividing the table feature map into (S+1)×(W+1) tables, and S represents a number of transverse through-lines and W represents a number of longitudinal through-lines. The preset short-line tag tensor is a parameter obtained by training the second table content by use of a deep convolution network in advance.

In the step, it should be understood that the preset short-line tag tensor includes a preset transverse short-line tag tensor and a preset longitudinal short-line tag tensor.

The preset transverse short-line tag tensor consists of all transverse short-line vectors. The preset longitudinal short-line tag tensor consists of all longitudinal short-line vectors. Each transverse short-line or each longitudinal short-line may be represented by a two-dimensional vector. The transverse short-lines has a total of (the number of transverse through-line)×(the number of longitudinal through-lines+1), and constitutes a matrix of (the number of transverse through-lines)×(the number of longitudinal through-lines+1). Similarly, the longitudinal short-line has a total of (the number of transverse through-lines+1)×(the number of longitudinal through-lines), and constitutes a matrix of (the number of transverse through-lines+1)×(the number of longitudinal through-lines).

In the embodiment, the table feature map is divided into (the number of transverse through-lines+1)×(the number of longitudinal through-lines+1) cells according to the transverse through-line and the longitudinal through-line. Feature extraction is performed on each cell by use of the deep convolutional neural network to obtain a feature vector for each cell. The preset short-line tag tensor is obtained by training the second table content by use of the deep convolution network in advance, and the training process is the same as the above-mentioned training process, and will not be described here.

In an embodiment, the short-line feature tensor includes a transverse short-line feature tensor and a longitudinal short-line feature tensor.

The transverse short-line feature tensor consists of a plurality of transverse short-through-line feature vectors, each of which is obtained by splicing feature vectors of two upper and lower adjacent cells.

The longitudinal short-line feature tensor consists of a plurality of longitudinal short-through-line feature vector, each of which is obtained by splicing feature vectors of two left and right adjacent cells.

It should be understood that a third objective function is constructed by the short-line feature tensor and the preset short-line tag tensor. In the embodiment of the present disclosure, the third objective function is also a negative log likelihood function. The likelihood estimation of data is maximized by minimizing the third objective function. The parameter updating of the deep convolutional neural network is then performed by using the batch gradient descent method.

The construction process of the third objective function is the same as that of the second objective function, and will not be described here. The parameter updating process of the deep convolutional neural network by using the batch gradient descent method is the same as that of the above embodiment, and will not be described here.

The apparatus according to an embodiment of the present disclosure will be described in detail below with reference to the accompanying drawings.

Figure 8:
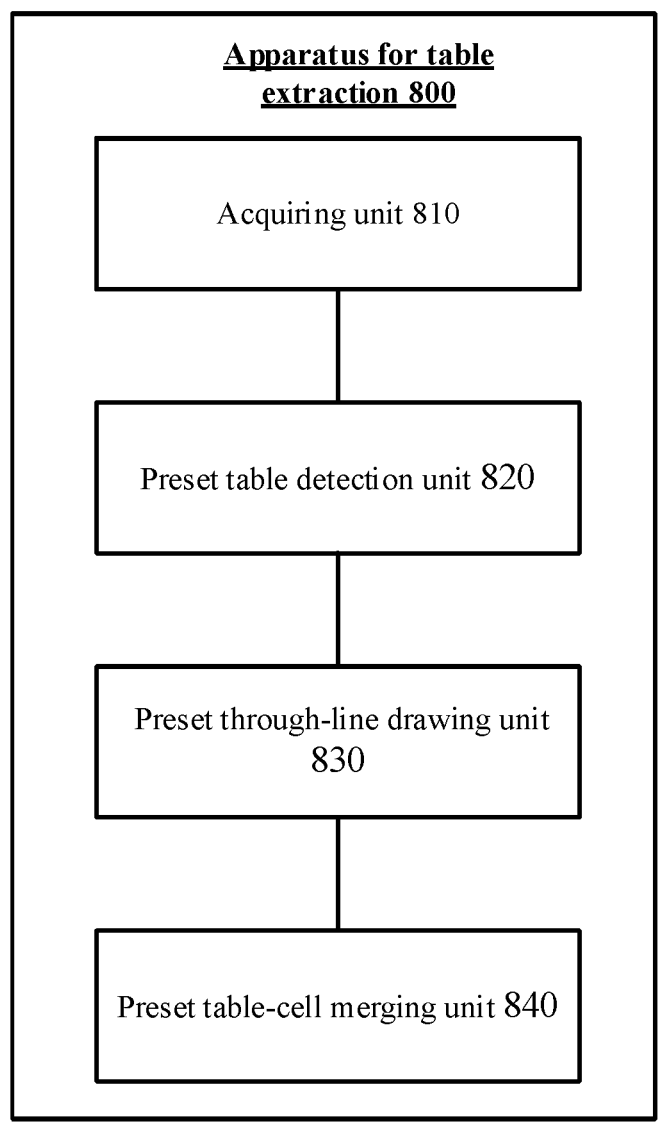
FIG. 8 is a schematic structural diagram of an apparatus for table extraction based on the richly formatted document according to an embodiment of the present disclosure.

FIG. 8 shows a schematic structural diagram of an apparatus for table extraction based on a richly formatted document according to an embodiment of the present disclosure. As shown in FIG. 8, the apparatus for table extraction based on richly formatted document 800 includes an acquiring unit 810, a preset table detection unit 820, a preset through-line drawing unit 830, and a preset table-cell merging unit 840.

The acquiring unit 810 is configured to acquire a richly formatted document which includes at least one page content.

The preset table detection unit 820 is configured to perform a table detection process on each page content in the richly formatted document to obtain a list of table tags, and to obtain a table content according to the page content and the list of table tags.

The preset through-line drawing unit 830 is configured to perform a through-line drawing process on the table content to obtain a list of through-line tags, and to obtain a second table content according to the table content and the list of through-line tags.

The preset table-cell merging unit 840 is configured to perform a table-cell merging process on the second table content to obtain a list of short-line tags, and to obtain an explicit table content according to the list of short-line tags and the second table content.

With the apparatus for table extraction in the embodiment of the present disclosure, the implicit table content can be extracted to obtain the explicit table content by use of the three pre-trained units of the preset table detection unit, the preset through-line drawing unit and the preset table-cell merging unit. It not only improves the efficiency of extraction, but also improves the accuracy of extraction, thereby accurately extracting the implicit table content.

Figure 9:
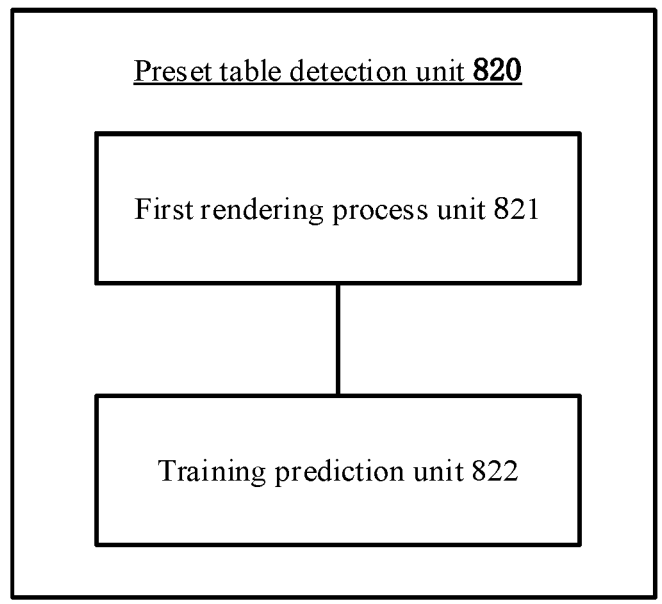
FIG. 9 is a schematic structural diagram of a preset table detection unit according to an embodiment of the present disclosure.

FIG. 9 is a schematic structural diagram of a preset table detection unit according to an embodiment of the present disclosure.

In an embodiment, as shown in FIG. 9, the preset table detection unit 820 includes a first rendering process unit 821 and a training prediction unit 822.

The first rendering process unit 821 is configured to perform a rendering process on the page content to obtain a page content tensor of the page content.

The training prediction unit 822 is configured to obtain a list of table tags according to the first preset training parameter and the page content tensor.

Figure 10:
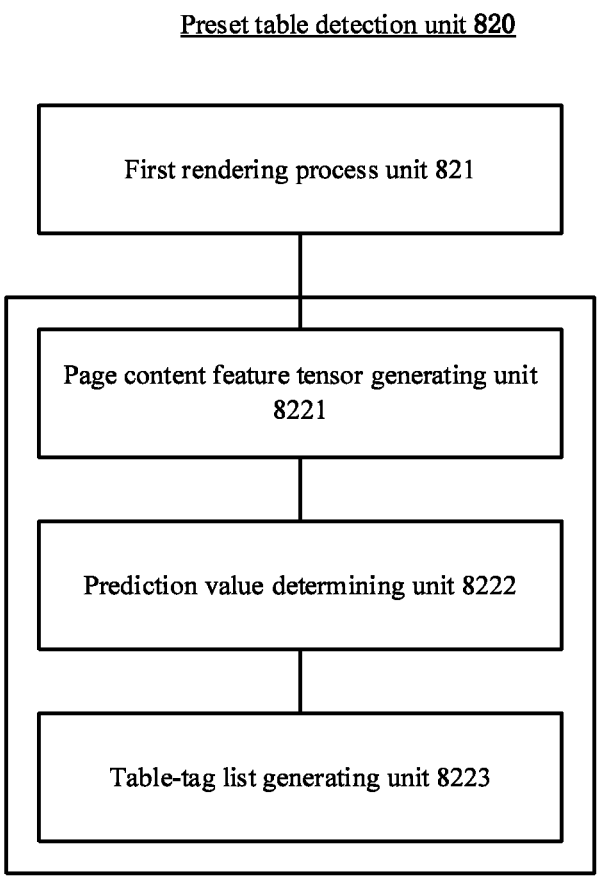
FIG. 10 is a schematic structural diagram of a preset table detection unit according to another embodiment of the present disclosure.

FIG. 10 shows a detailed structural diagram of a preset table detection unit according to another embodiment of the present disclosure.

In an embodiment, as shown in FIG. 10, the training prediction unit 822 may include a page content feature tensor generating unit 8221, a prediction value determining unit 8222, and a table-tag list generating unit 8223.

The page content feature tensor generating unit 8221 is configured to calculate the page content tensor according to the first preset training parameter to determine a feature tensor of the page content.

The prediction value determining unit 8222 is configured to traverse table information of each area in the feature tensor to determine a prediction value. If the prediction value is greater than a preset reliability threshold, it is determined that an area contains a table.

Or if the prediction value is less than the preset reliability threshold, it is determined that an area does not contain a table.

The table-tag list generating unit 8223 is configured to determine a table tag for each area containing a table to obtain a list of table tags.

In an embodiment, the first preset training parameter is a parameter determined by the feature tensor of the page content and a preset table tag tensor. The preset table tag tensor is a parameter obtained by performing an area division process on the page content.

In an embodiment, the area division process is to divide each page content into m×n areas to determine a table tag tensor of each area containing a table, m and n determining that each area contains only one table and each table belongs to only one area, and m and n being integers greater than zero.

In an embodiment, a dimension of the page content feature tensor is the same as that of the preset table tag tensor.

In an embodiment, the preset through-line drawing unit 830 may include a second rendering process unit 831 and a second training prediction unit 832.

The second rendering process unit 831 is configured to perform a rendering process on the first table content to obtain a second table content tensor.

The second training prediction unit 832 obtains the list of through-line tags according to the second table content tensor and the second preset training parameter.

In an embodiment, the second preset training parameter is a parameter determined by a feature tensor of the second table content and a preset through-line tag tensor. The feature tensor of the second table content is a parameter obtained by performing feature extraction on the first table content. The preset through-line tag tensor consists of a plurality of through-line vectors, and each through-line vector refers to a centerline vector for each area.

In an embodiment, a dimension of the table content feature tensor is the same as that of the preset through-line tag tensor.

In an embodiment, the preset table-cell merging unit 840 may include a third rendering process unit 841, a third feature process unit 842, and a third training prediction unit 843.

The third rendering process unit 841 is configured to perform a rendering process on the second table content to obtain a third table content tensor.

The third feature process unit 842 is configured to perform a feature process on the third table content tensor to obtain a table feature map.

The third training prediction unit 843 is configured to obtain a list of short-line tags according to the table feature map and the third preset training parameter.

In an embodiment, the third preset training parameter is a parameter determined by a short-line feature tensor and a preset short-line tag tensor, the short-line feature tensor is a parameter obtained by splicing feature vectors of each cell, and the feature vectors of each cell are parameters obtained by performing feature extraction on each cell, the cell being obtained by dividing the table feature map into (S+1)×(W+1) tables, S representing a number of transverse through-lines and W representing a number of longitudinal through-lines, and the preset short-line tag tensor being a parameter obtained by training the second table content by use of a deep convolution network in advance.

In an embodiment, the short-line feature tensor includes a transverse short-line feature tensor and a longitudinal short-line feature tensor.

The transverse short-line feature tensor consists of a plurality of short-through-line feature vectors, each of which is obtained by splicing feature vectors of two upper and lower adjacent cells.

The longitudinal short-line feature tensor consists of a plurality of longitudinal short-through-line feature vectors, each of which s is obtained by splicing feature vectors of two left and right adjacent cells.

Other details of the apparatus for table extraction according to the embodiment of the present disclosure are similar to those of the method according to the embodiment of the present disclosure described above with reference to FIG. 1 through FIG. 7, and are not described herein again.

Figure 11:
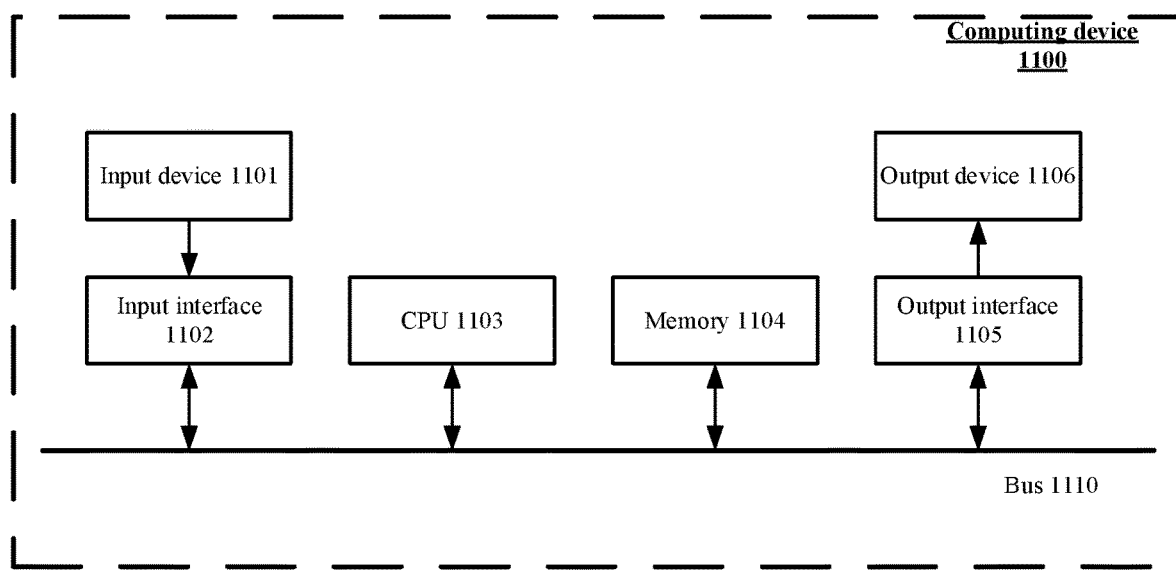
FIG. 11 is a structural diagram showing an exemplary hardware architecture of a computing device capable of implementing a method and an apparatus for table extraction according to an embodiment of the present disclosure.

FIG. 11 is a structural diagram showing an exemplary hardware architecture of a computing device capable of implementing a method and an apparatus for table extraction according to an embodiment of the present disclosure.

As shown in FIG. 11, a computing device 1100 includes an input device 1101, an input interface 1102, a CPU 1103, a memory 1104, an output interface 1105, and an output device 1106. The input interface 1102, the CPU 1103, the memory 1104, and the output interface 1105 are connected to each other through a bus 1110. The input device 1101 and the output device 1106 are respectively connected to the bus 1110 through the input interface 1102 and the output interface 1105, and further connected to other components of the computing device 1100. Specifically, the input device 1101 receives input information from outside and transmits the input information to the CPU 1103 through the input interface 1102. The CPU 1103 processes the input information based on computer executable instructions stored in the memory 1104 to generate output information. The output information is temporarily or permanently stored in the memory 1104, and then transmitted to the output device 1106 through the output interface 1105. The output device 1106 outputs the output information to the outside of the computing device 1100 for use by the user.

In one embodiment, the computing device 1100 shown in FIG. 11 may be implemented as a system for table extraction including a memory and a processor. The memory is configured to store executable program codes; and the processor is configured to read the executable program codes stored in the memory to perform the method for table extraction of the above embodiments.

The above embodiments may be implemented entirely or partly by software, hardware, firmware or any combination thereof. When it is implemented by software, it may be entirely or partly implemented as a computer program product or a computer readable storage medium. The computer program product or the computer readable storage medium includes one or more computer instructions. When the computer program instructions are loaded and executed on a computer, they entirely and partly produce the flowchart or functions described in the embodiments of the present disclosure. The computer may be a general purpose computer, a special purpose computer, a computer network, or another programmable apparatus. The computer instructions may be stored in the computer readable storage medium or may be transmitted from a computer readable storage medium to another computer readable storage medium. For example, the computer instructions may be transmitted by wire (for example, coaxial cable, optical fiber, digital subscriber line (DSL)) or wireless (for example, infrared, radio, microwave and so on) from a website, computer, server or data center to another website, computer, server or data center. The computer readable storage medium may be any applicable medium accessible by the computer or a data storage device such as a server or a data center integrated with one or more applicable media. The applicable medium may be a magnetic medium (for example, a soft disk, a hard disk, a magnetic tape), an optical medium (for example, a DVD) or a semiconductor medium (for example, a solid state disk (SSD)) and so on.

It is to be understood that the embodiments of the present disclosure are not limited to the specific configurations and processes described above and shown in the drawings. Also, for the purpose of concision, the detailed description of known technique is omitted herein. In the above embodiments, a number of specific steps are described and illustrated as examples. However, the processes of the embodiments of the present disclosure are not limited to the specific steps described and illustrated. A person skilled in the art may make various changes, modifications and additions, or change the order of the steps after understanding the spirit of the present disclosure.

The above description is only for illustrating the specific embodiments of the present disclosure. It will be apparent to those skilled in the art that, for the sake of convenience and simplicity of description, specific operating processes of the systems, units and elements described above may be known by referring to corresponding processes in the foregoing method embodiments, and will not be repeated herein. It is to be understood that the scope of the present disclosure is not limited thereto. Within the technical scope of the present disclosure, various modifications or substitutions may be readily apparent to those skilled in the art, and all of the modifications or substitutions are to be included within the scope of the present disclosure.

What is claimed is:

1. A method for table extraction based on a richly formatted document, the method comprising:
   acquiring the richly formatted document which includes at least one page content;
   performing, by use of a preset table detection model, a table detection process on the page content in the richly formatted document to obtain a list of table tags, and to obtain a first table content according to the page content and the list of table tags;

performing, by use of a preset through-line drawing model, a through-line drawing process on the first table content to obtain a list of through-line tags, and to obtain a second table content according to the first table content and the list of through-line tags; and performing, by use of a preset table-cell merging model, a table-cell merging process on the second table content to obtain a list of short-line tags, and to obtain an explicit table content according to the list of short-line tags and the second table content, wherein the performing, by use of a preset table-cell merging model, a table-cell merging process on the second table content to obtain a list of short-line tags comprises:

performing a rendering process on the second table content to obtain a third table content tensor;

performing a feature process on the third table content tensor to obtain a table feature map; and obtaining the list of short-line tags according to the table feature map and a third preset training parameter, wherein the third preset training parameter is a parameter determined by a short-line feature tensor and a preset short-line tag tensor, the short-line feature tensor is a parameter obtained by splicing feature vectors of each cell, the feature vectors of each cell are parameters obtained by performing feature extraction on each cell, the cell is obtained by dividing the table feature map into (S+1)×(W+1) tables, S represents a number of transverse through-lines, W represents a number of longitudinal through-lines, and the preset short-line tag tensor is a parameter obtained by training the second table content by use of a deep convolution network in advance.

2. The method according to claim 1, wherein the performing, by use of a preset table detection model, a table detection process on the page content in the richly formatted document to obtain a list of table tags comprises:

performing a rendering process on the page content to obtain a page content tensor of the page content; and obtaining the list of table tags according to a first preset training parameter and the page content tensor.

3. The method according to claim 2, wherein the obtaining the list of table tags according to the first preset training parameter and the page content tensor comprises:

calculating the page content tensor according to the first preset training parameter to determine a feature tensor of the page content;

traversing table information of each area in the feature tensor to determine a prediction value;

determining that an area contains a table if the prediction value for the area is greater than a preset reliability threshold, or determining that an area does not contain a table if the prediction value for the area is less than the preset reliability threshold; and determining a table tag for each area containing a table to obtain the list of table tags.

4. The method according to claim 3, wherein the first preset training parameter is a parameter determined by the feature tensor of the page content and a preset table tag tensor, and the preset table tag tensor is a parameter obtained by performing an area division process on the page content.

5. The method according to claim 4, wherein the area division process is to divide each page content into m×n areas to determine a table tag tensor of each area containing a table, m and n determining that each area contains only one table and each table belongs to only one area, and m and n being integers greater than zero.

6. The method according to claim 4, wherein a dimension of the feature tensor of the page content equals to a dimension of the preset table tag tensor.

7. The method according to claim 1, wherein performing, by use of a preset through-line drawing model, a through-line drawing process on the first table content to obtain a list of through-line tags comprises:

performing a rendering process on the first table content to obtain a second table content tensor; and obtaining the list of through-line tags according to the second table content tensor and a second preset training parameter.

8. The method according to claim 7, wherein the second preset training parameter is a parameter determined by a feature tensor of the second table content and a preset through-line tag tensor, the feature tensor of the second table content is a parameter obtained by performing feature extraction on the first table content, and the preset through-line tag tensor consists of a plurality of through-line vectors, each through-line vector referring to a centerline vector for each area.

9. The method according to claim 8, wherein a dimension of the feature tensor of the second table content equals to a dimension of the preset through-line tag tensor.

10. The method according to claim 1, wherein the short-line feature tensor comprises a transverse short-line feature tensor and a longitudinal short-line feature tensor;

the transverse short-line feature tensor consists of a plurality of transverse short-through-line feature vectors, each of which is obtained by splicing feature vectors of two upper and lower adjacent cells; and the longitudinal short-line feature tensor consists of a plurality of longitudinal short-through-line feature vectors, each of which is obtained by splicing feature vectors of two left and right adjacent cells.

11. The method according to claim 1, wherein the page content comprises at least one of:

all lines, color blocks, text box positions, and text box contents in the page.

12. The method according to claim 1, wherein the table content comprises at least one of:

all lines, color blocks, text box positions, and text box contents in the table.

13. The method according to claim 1, wherein the list of table tags is configured to record position information of all tables in the richly formatted document, the position information of a table comprising an abscissa of an upper left corner of the table, an ordinate of the upper left corner of the table, a width of the table, and a height of the table.

14. A non-transitory computer readable storage medium storing computer program instructions which, when executed by a processor, cause the processor to perform the method for table extraction according to claim 1.

15. An apparatus for table extraction based on a richly formatted document, the apparatus comprising a processor and a memory storing computer program instructions, wherein the computer program instructions, when executed by the processor, cause the processor to:

acquire the richly formatted document which includes at least one page content;

perform a table detection process on each page content in the richly formatted document to obtain a list of table tags, and obtain a first table content according to the page content and the list of table tags;

perform a through-line drawing process on the first table content to obtain a list of through-line tags, and obtain a second table content according to the first table content and the list of through-line tags; and perform a table-cell merging process on the second table content to obtain a list of short-line tags, and obtain an explicit table content according to the list of short-line tags and the second table content, wherein the computer program instructions, when executed by the processor, cause the processor to perform the table-cell merging process on the second table content to obtain the list of short-line tags by:

performing a rendering process on the second table content to obtain a third table content tensor;

performing a feature process on the third table content tensor to obtain a table feature map; and obtaining the list of short-line tags according to the table feature map and a third preset training parameter, wherein the third preset training parameter is a parameter determined by a short-line feature tensor and a preset short-line tag tensor, the short-line feature tensor is a parameter obtained by splicing feature vectors of each cell, the feature vectors of each cell are parameters obtained by performing feature extraction on each cell, the cell is obtained by dividing the table feature map into $(S+1)\times(W+1)$ tables, S represents a number of transverse through-lines, W represents a number of longitudinal through-lines, and the preset short-line tag tensor is a parameter obtained by training the second table content by use of a deep convolution network in advance.

* * * * *